(12) United States Patent
Gal et al.

(10) Patent No.: US 6,411,202 B1
(45) Date of Patent: Jun. 25, 2002

(54) VEHICLE SENSOR APPARATUS

(75) Inventors: Eli Gal, Ramat Gan; Uri Agam, Petach Tikva; Eli Ben-Bassat, Holon; Ronen Jashek, Yashresh Village, all of (IL)

(73) Assignee: Sensotech Ltd., Petach Tikva (IL)

( * ) Notice: Subject to any disclaimer, the term of this patent is extended or adjusted under 35 U.S.C. 154(b) by 0 days.

(21) Appl. No.: 09/423,095
(22) PCT Filed: Mar. 4, 1998
(86) PCT No.: PCT/IL98/00107
§ 371 (c)(1),
(2), (4) Date: Dec. 22, 1999
(87) PCT Pub. No.: WO98/50258
PCT Pub. Date: Nov. 12, 1998

(30) Foreign Application Priority Data

May 1, 1997 (IL) ................................................ 120755

(51) Int. Cl.$^7$ ............................. B60Q 1/00; B60R 21/32
(52) U.S. Cl. ................... 340/425.5; 340/438; 340/439; 340/436; 340/545.1; 340/545.3; 340/545.7; 340/566; 180/271; 180/274; 280/735; 307/9.1; 701/45
(58) Field of Search ............................. 340/425.5, 438, 340/439, 435, 436, 903, 545.1, 545.3, 545.7, 550–554, 566, 573.1; 180/167, 169, 271, 274, 279; 280/735, 736; 307/9.1, 10.1; 701/36, 45; 367/93, 94

(56) References Cited

U.S. PATENT DOCUMENTS

| 2,826,753 A | 3/1958 | Chapin |
| 3,231,880 A | 1/1966 | Stein |
| 4,029,176 A | * 6/1977 | Mills ............................. 49/25 |
| 4,274,226 A | 6/1981 | Evans |
| RE30,719 E | 8/1981 | Mills |
| 4,590,410 A | 5/1986 | Jonsson |
| 4,779,240 A | 10/1988 | Dorr |
| 4,973,837 A | * 11/1990 | Bradbeer ..................... 340/556 |
| 4,976,337 A | 12/1990 | Trett |
| 5,001,557 A | 3/1991 | Begle |
| RE33,668 E | 8/1991 | Gray |
| 5,147,410 A | 9/1992 | Heindl et al. |
| 5,149,921 A | 9/1992 | Picado |
| 5,276,391 A | 1/1994 | Jonsson |
| 5,319,611 A | 6/1994 | Korba |
| 5,337,289 A | 8/1994 | Fasching et al. |
| 5,339,075 A | 8/1994 | Abst et al. |
| 5,341,344 A | 8/1994 | O'Brien et al. |
| 5,373,482 A | 12/1994 | Gauthier |
| 5,410,227 A | * 4/1995 | Toyozumi et al. .......... 318/283 |
| 5,412,297 A | 5/1995 | Clark et al. |
| 5,420,430 A | 5/1995 | Trett |
| 5,450,057 A | 9/1995 | Watanabe |
| 5,467,072 A | 11/1995 | Michael |
| 5,482,314 A | 1/1996 | Corrado et al. ............. 280/735 |
| 5,563,483 A | 10/1996 | Kowall et al. |
| 5,653,462 A | 8/1997 | Breed et al. |
| 5,670,853 A | 9/1997 | Bauer |
| 5,675,326 A | * 10/1997 | Juds et al. ................... 340/904 |
| 5,770,997 A | 6/1998 | Kleinberg et al. |

FOREIGN PATENT DOCUMENTS

| EP | 0357225 | 3/1990 | ........... B60R/21/22 |
| WO | 94/22693 | 10/1994 | ........... B60R/21/16 |

* cited by examiner

Primary Examiner—Donnie L. Crosland
(74) Attorney, Agent, or Firm—Darby & Darby

(57) ABSTRACT

A safety system for a vehicle including at least one sensor (20) viewing at least one region (22) in an interior portion of a vehicle defining a protected volume at least partially in front of the vehicle airbag, and logic circuitry responsive to the at least one sensor (20) for determining geometric data of objects (151) in the protected volume.

36 Claims, 12 Drawing Sheets

VEHICLE SENSOR APPARATUS

FIELD OF THE INVENTION

The present invention relates to vehicle safety apparatus, for example, vehicle door sensor apparatus and sensor apparatus for air bags.

BACKGROUND OF THE INVENTION

Automatic doors are in widespread use in various applications, such as elevators, buses and trains. Considerations of personal safety require that doors not be closed when there is a danger that a person might be impacted thereby. While not compromising safety considerations, considerations of efficiency dictate that doors be closed as promptly and quickly as possible.

There exist various techniques and apparatus for sensing the absence of a person and his accouterments within a predefined zone and consequently operating an automatic door. U.S. Pat. Nos. 4,029,176; 4,590,410; 4,779,240; 4,976,337; 5,001,557; 5,149,921; 5,276,391; 5,412,297; 5,420,430; RE 33,668 and RE 30,719 exemplify the state of the art. U.S. Pat. No. 5,412,297 employs a tactile obstruction detector, while U.S. Pat. Nos. 4,590,410 and 5,276,391 employ optical detectors. U.S. Pat. No. 2,826,753, which relates to object detection in a confined environment and not to door opening or closing, and U.S. Pat. Nos. RE 30,719; 4,029,176 and 5,147,410 employ acoustic energy and are believed by applicant to be the closest prior art to the present invention. Other distance and direction measuring apparatus is described in U.S. Pat. Nos. 5,467,072; 5,450,057; 5,373,482; 5,341,344; 5,339,075; 5,337,289 and 5,319,611.

Another problem in the field of vehicle safety relates to the use of air bags. Air bags are designed to expand or inflate and protect occupants of a vehicle from damage during collisions or sudden stopping. Unfortunately there have been instances in which the air bags have expanded in such a way so as to choke and asphyxiate the vehicle occupants. There is thus a need to be able to control expansion of the air bags in order to properly protect the vehicle occupants without causing asphyxiation.

SUMMARY OF THE INVENTION

The present invention seeks to provide a secure and efficient door operating system which maximizes door closing efficiency while minimizing the risk of injury to users. The present invention is particular useful for sliding and hatchback doors, such as those of commercial vehicles, vans and trucks.

The present invention also seeks to provide a safety system for controlling operation of vehicle air bags. The system transmits energy pulses, such as pulses of ultrasonic energy, towards a volume to be protected volume. Following a predetermined time delay, the system receives echoes of the energy reflected from the protected volume. The system thus senses and measures geometry of objects in the protected volume, generally in a volume in front of the dashboard and/or steering wheel. In accordance with the received echoes, the system of the present invention determines if a vehicle seat is first of all actually occupied. In this way, if the passenger seat is unoccupied, the passenger seat air bag will not be unnecessarily deployed. If the seat is occupied, the system senses the geometry of the occupant and uses the sensed geometry to determine an optimal mode of air bag expansion, particularly useful with a variable expansion air bag system. For example, the sensed geometry may signal and alert the system that a particularly short driver is occupying the driver's seat and thereby cause the air bag to inflate in such a way that the driver is protected from damage and is not asphyxiated by an overlarge bag. The objects in the protected volume may be stationary or moving. For example, the movements of an infant moving about in a car seat can be sensed and used to distinguish between a moving infant and a stationary car seat. The air bag may then be instructed to inflate in such a way so as not to harm the infant no matter what his or her movements may be.

There is thus provided in accordance with a preferred embodiment of the present invention a safety system for a vehicle, including at least one sensor viewing at least one region in an interior portion of a vehicle defining a protected volume at least partially in front of a vehicle air bag, and logic circuitry responsive to the at least one sensor for determining geometric data of objects in the protected volume.

In accordance with a preferred embodiment of the present invention the sensor transmits energy pulses into the protected volume and receiving echoes of energy reflected from the protected volume during a time window.

Additionally in accordance with a preferred embodiment of the present invention the logic circuitry is operative to ignore energy reflections from at least one object sensed by the at least one sensor during certain intervals of time within the time window.

Further in accordance with a preferred embodiment of the present invention the system includes a variable expansion air bag system operatively connected to and controlled by the logic circuitry, wherein the variable expansion air bag system inflates the air bag in accordance with information received from the logic circuitry.

Still further in accordance with a preferred embodiment of the present invention the variable expansion air bag system includes an inflator which inflates the air bag with a fluid and a valve controlled by the logic circuitry, the valve controlling inlet of the fluid into the air bag.

There is also provided in accordance with a preferred embodiment of the present invention a method for controlling operation of vehicle air bags, including using at least one sensor to sense at least one region in an interior portion of a vehicle defining a protected volume at least partially in front of a vehicle air bag, determining geometric data of objects in the protected volume in accordance with the echoes from the at least one sensor, and inflating the air bag in accordance with the geometric data.

In accordance with a preferred embodiment of the present invention the step of using at least one sensor to sense includes transmitting energy pulses into the protected volume and receiving echoes of energy reflected from the protected volume during a time window.

Additionally in accordance with a preferred embodiment of the present invention the method includes ignoring energy reflections from at least one object sensed by the at least one sensor during certain intervals of time within the time window and varying inflation of the air bag in accordance with the ignored energy reflections.

Further in accordance with a preferred embodiment of the present invention the method includes suppressing inflation of the air bag in accordance with the geometric data.

There is also provided in accordance with a preferred embodiment of the present invention a method for warning of danger of closing a vehicle sliding door, the method including using at least one sensor to sense at least one region in the vicinity of a sliding door of a vehicle, outputting at least one region clear output signal from the at least one sensor to logic circuitry responsive to the at least one sensor, and using the logic circuitry to provide a warning of danger of closing the sliding door in the absence of a region clear output signal.

There is also provided in accordance with a preferred embodiment of the present invention a method for warning of danger of closing a vehicle hatchback door, the method including using at least one sensor to sense at least one region in the vicinity of a hatchback door of a vehicle, outputting at least one region clear output signal from the at least one sensor to logic circuitry responsive to the at least one sensor, and using the logic circuitry to provide a warning of danger of closing the hatchback door in the absence of a region clear output signal.

In accordance with a preferred embodiment of the present invention the method includes using the logic circuitry to signal permissibility of closing the door in the presence of a region clear output signal.

Additionally in accordance with a preferred embodiment of the present invention the method includes ignoring any sensed objects in predetermined regions within an outer boundary of the predetermined volume, corresponding to predetermined time domains.

There is also provided in accordance with a preferred embodiment of the present invention a vehicle including a chassis, a body, propulsion apparatus, at least one door and door control apparatus including at least one sensor viewing at least one region in the vicinity of the door, logic circuitry responsive to the at least one sensor for providing at least one region clear output signal, and an alarm device responsive at least to an absence of a region clear output signal to provide a warning signal of danger of closing the door and responsive at least to a presence of a region clear output signal to signal indicating permissibility of closing the door.

Additionally in accordance with a preferred embodiment of the present invention the warning signal includes at least one of an audible and a visual output signal. Preferably the signal indicating permissibility of closing the door includes at least one of an audible and a visual output signal.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
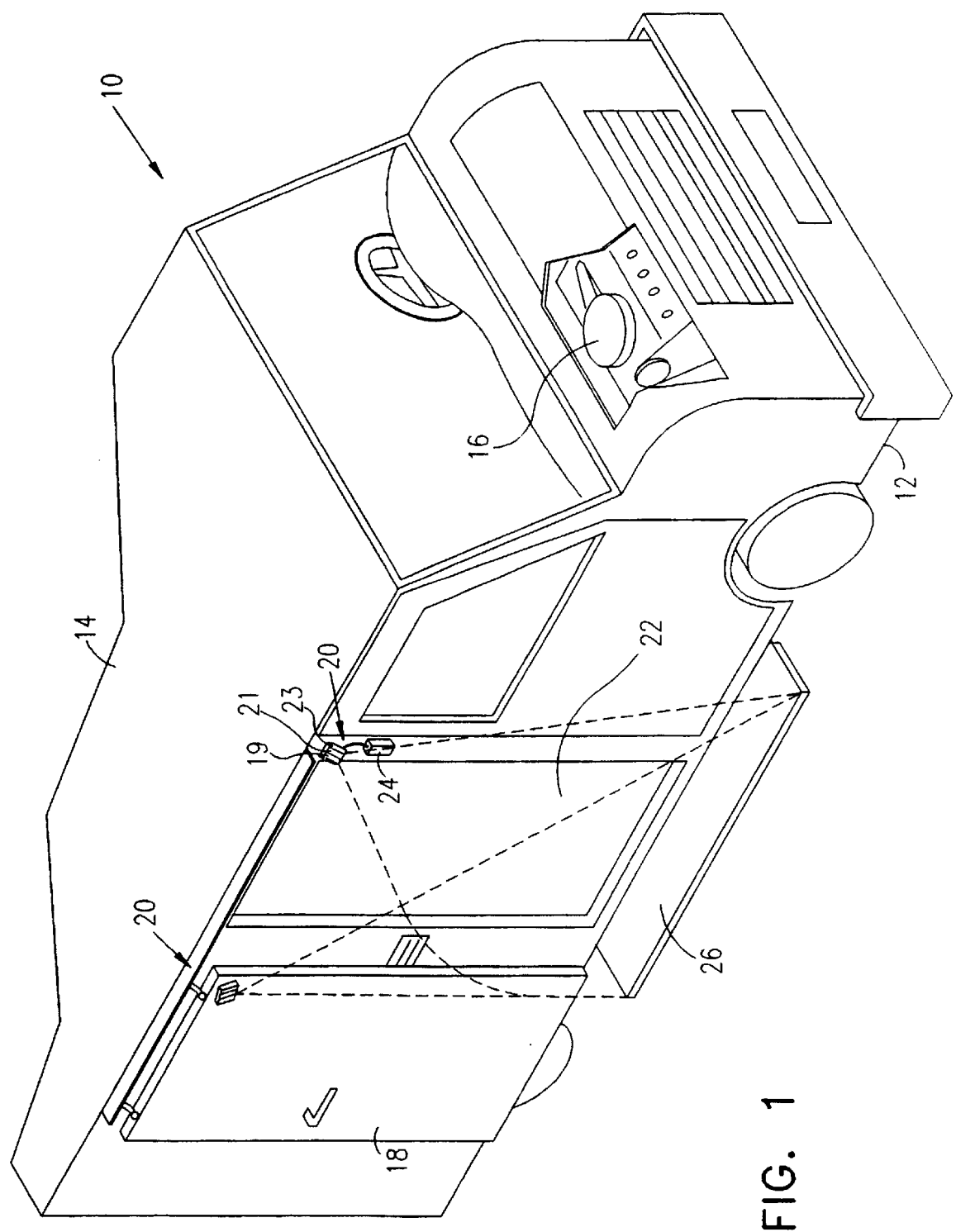
FIG. 1 is a simplified pictorial illustration of a van with a sliding door and provided with a sensor system for warning of danger of closing the sliding door, constructed and operative in accordance with a preferred embodiment of the present invention.

Reference is now made to FIG. 1, which illustrates a vehicle, such as a van 10, having a chassis 12, a body 14 and propulsion apparatus 16. Body 14 includes at least one sliding door 18, a sensor system 20 for sensing the presence of an object within a predetermined volume 22, also termed the "protected" volume, in the vicinity of door 18, and an alarm device 24 operative at least partially in response to an output from sensor 20 to warn of danger of closing door 18. Optionally, alarm device 24 may signal permissibility of closing door 18. Alarm device 24 may emit an audible or visible signal, for example.

In accordance with a preferred embodiment of the invention, the predetermined volume 22 covers the opening region of door 18 and above a step 26 leading to door 18 from the outside thereof and does not extend outwardly thereof, thereby to avoid false detections of objects or images beyond the steps.

Sensor system 20 preferably operates in accordance with the sensor system of safety apparatus disclosed in applicant/assignee's PCT Patent Application PCT/IL96/00142, filed Nov. 4, 1996, the disclosure of which is incorporated herein by reference. Sensor system 20 may be mounted on a stationary portion of body 14. Alternatively or additionally, sensor system 20 may be mounted on sliding door 18 itself, as shown in dashed lines in FIG. 1.

In accordance with a preferred embodiment of the present invention, sensor system 20 employs one, two or three ultrasonic transceivers or any other suitable sensors which transmit energy into a volume and sense energy reflected therefrom. The amount of sensors employed affects the amount of information which can be sensed and the internal configuration of the protected volume, as will be explained further hereinbelow. For the sake of clarity, the three possible sensors of system 20 are designated 19, 21 and 23.

It is known to limit boundaries of the field of view of such sensors by limiting the time duration over which received reflected energy is taken into account, in other words, by limiting the time window of reflected energy from a volume thereby to define a desired protected volume. In accordance with a preferred embodiment of the invention, not only the boundaries of the field of view of sensor system 20 are limited, but also the internal configuration of the protected volume is defined by suitably limiting the time window of reflected energy.

Figure 2:
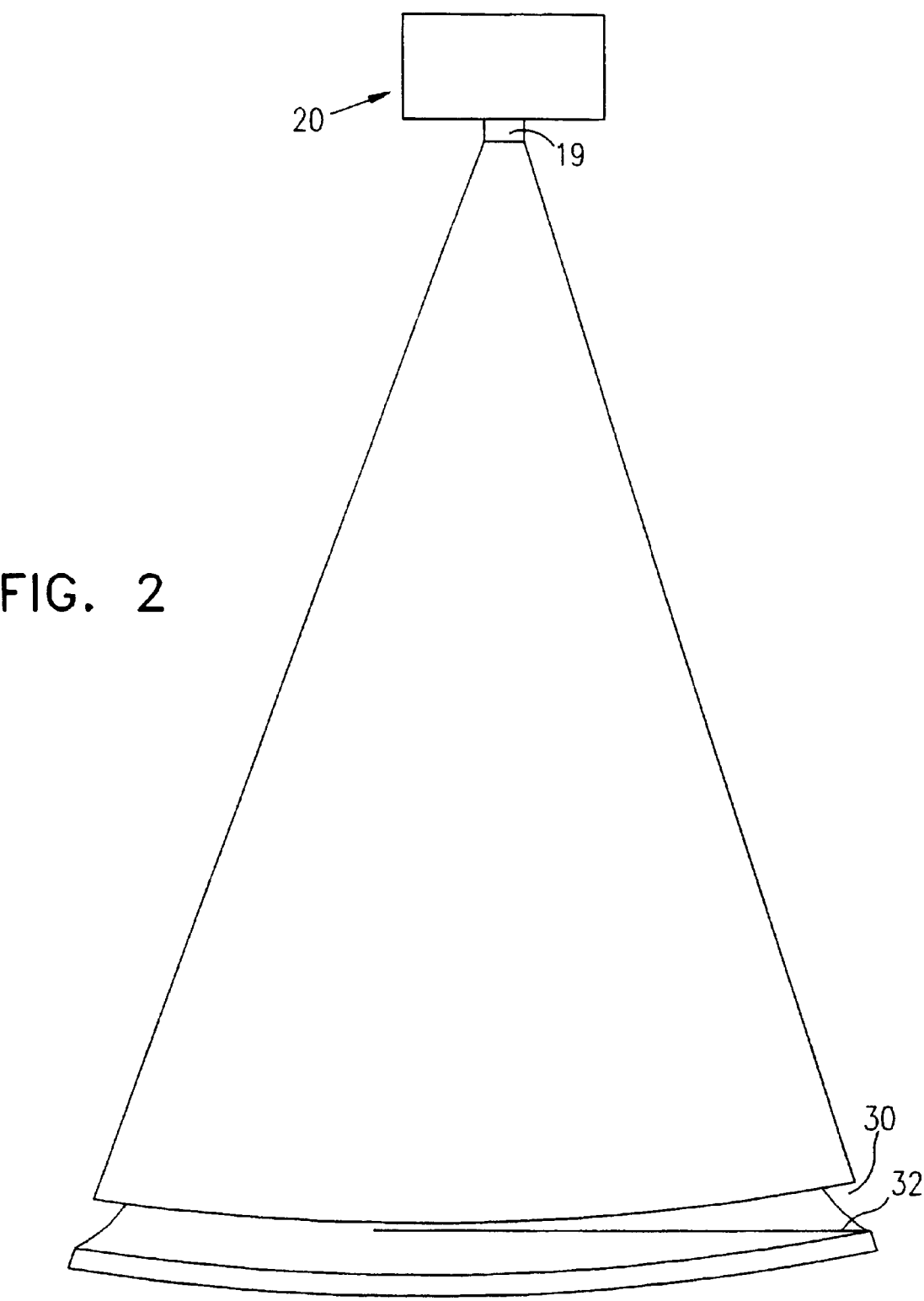
FIG. 2 is a sectional illustration taken along the plane A shown in FIG. 1, and corresponding to employment of a single sensor of the safety sensor system.

Reference is now made to FIG. 2 which is an illustration taken along the plane A shown in FIG. 1, and corresponds to employment of a single sensor 19 of sensor system 20. It can be seen that if it is desired to eliminate energy reflections from the top facing surface of step 26, it is necessary to ignore energy reflections during certain intervals of time within the time window. These intervals correspond to predetermined radial distance outlines from sensor 19 and are indicated in FIG. 2 by reference numerals 30.

The resulting outlines of the distances corresponding to the intervals are thus seen to be curved. Within each distance outline, a corresponding top surface 32 of step 26 is schematically drawn to illustrate that due to the curvature of the distance outlines, the thickness thereof must be sufficient to enable the outline to enclose the entire top surface 32 of the step.

Figure 3:
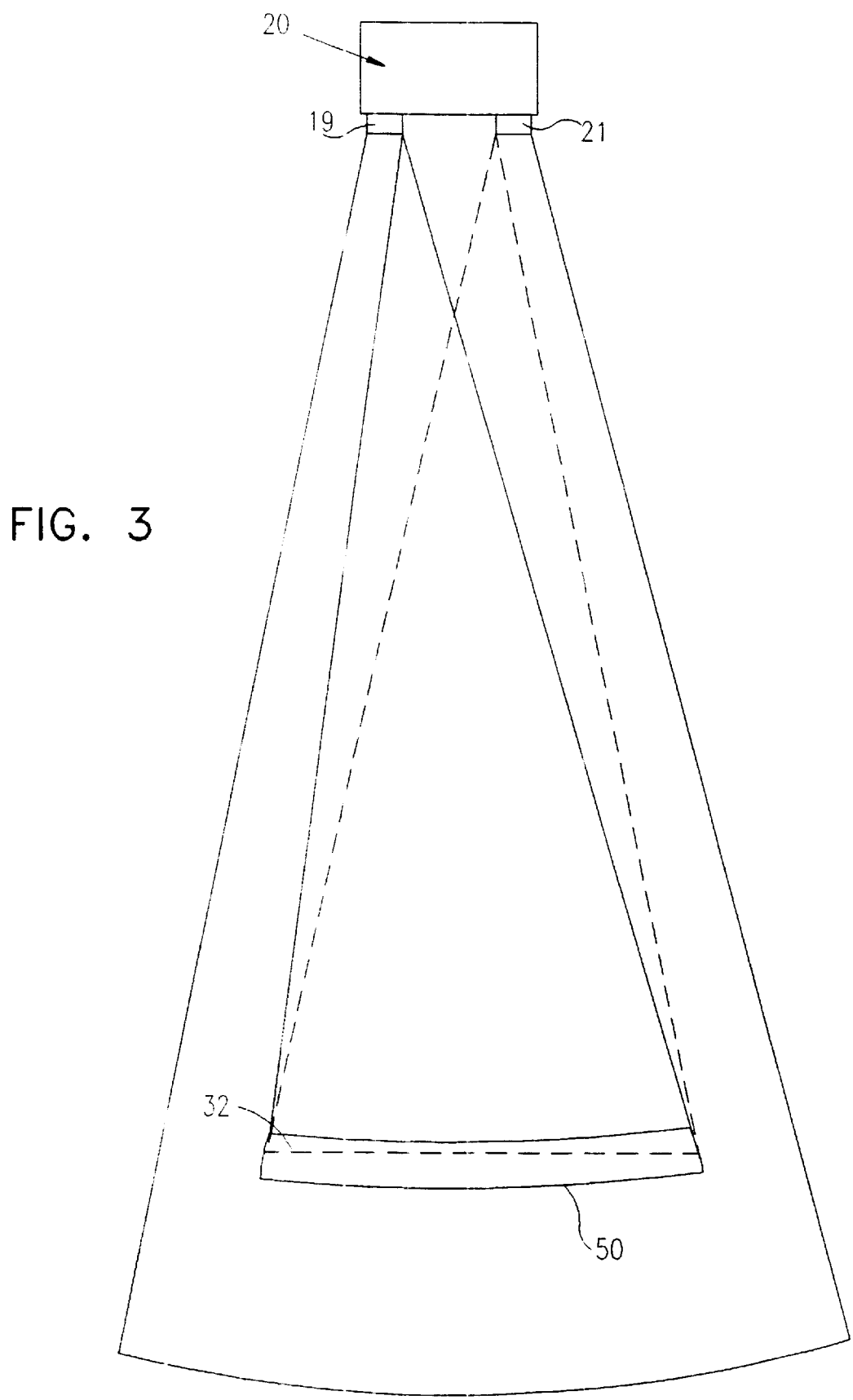
FIG. 3 is a sectional illustration taken along the plane A shown in FIG. 1, and corresponding to employment of two sensors of the safety sensor system.

Reference is now made to FIG. 3 which is an illustration taken along the plane A shown in FIG. 1, and corresponds to employment of a pair of sensors of sensor system 20, such as sensors 19 and 21. In accordance with a preferred embodiment of the invention, the internal configuration of the protected volume is defined not only by suitably limiting the time window of reflected energy but also by triangulation in two dimensions by virtue of the time differences in receipt of reflections by the individual sensors 19 and 21.

It can be seen that if it is desired to eliminate energy reflections from the top facing surface of step 26, it is not necessary to ignore energy reflections during fill intervals of time within the time window, as in the embodiment of FIG. 2. Only portions of these intervals, corresponding to the width and location of the top facing surface of step 26 need be ignored. These portions are determined by triangulation of the outputs of the two sensors 19 and 21 and are indicated in FIG. 3 by reference numerals 50.

Within each distance outline corresponding to an interval outline, a corresponding top surface 32 of a step 26 is schematically drawn to illustrate that the location and width of the portion of the distance outline which is ignored corresponds to the width and location of the step and is determined by triangulation.

Figure 4:
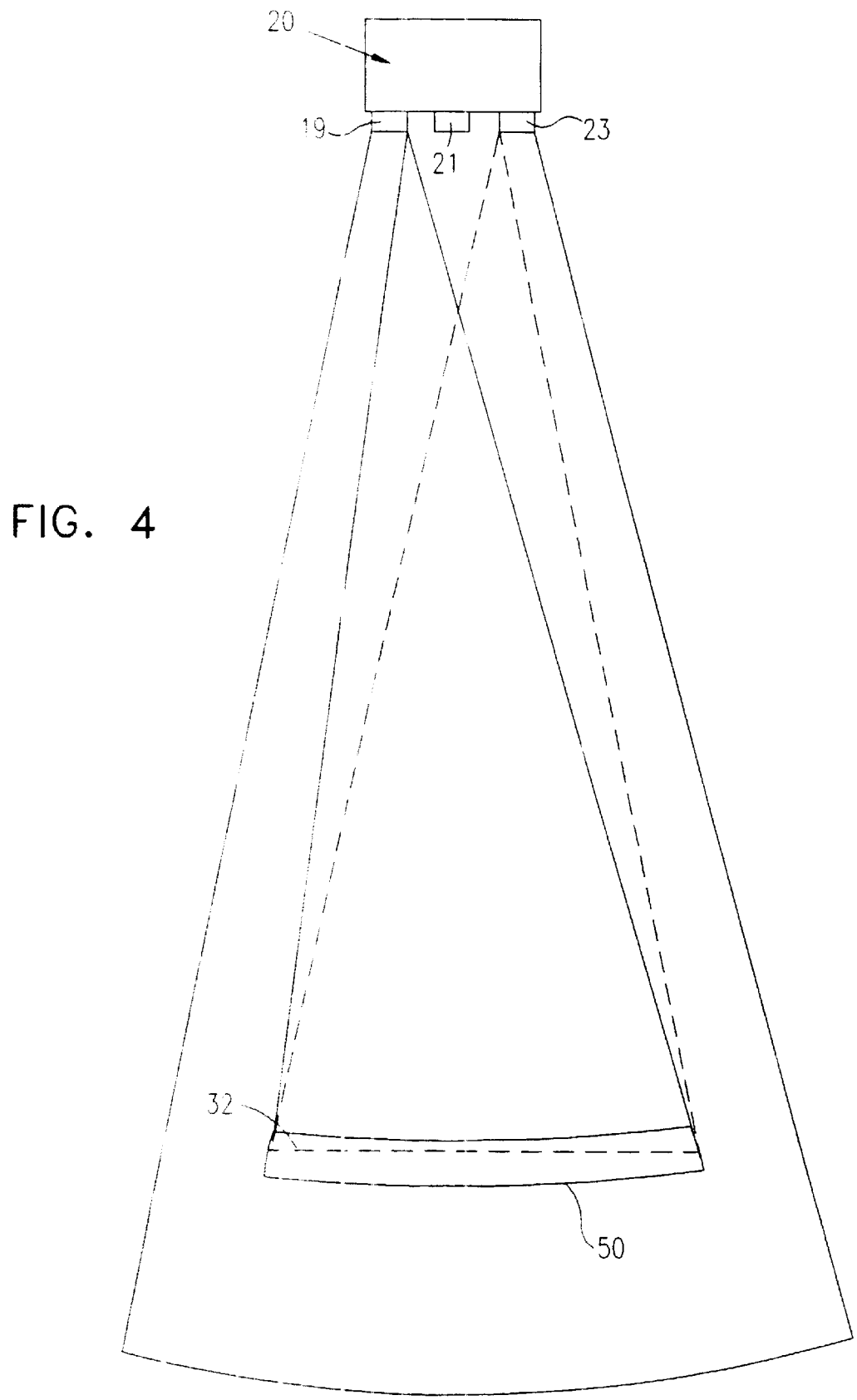
FIG. 4 is a sectional illustration taken along the plane A shown in FIG. 1, and corresponding to employment of three sensors of the safety sensor system.
Figure 5:
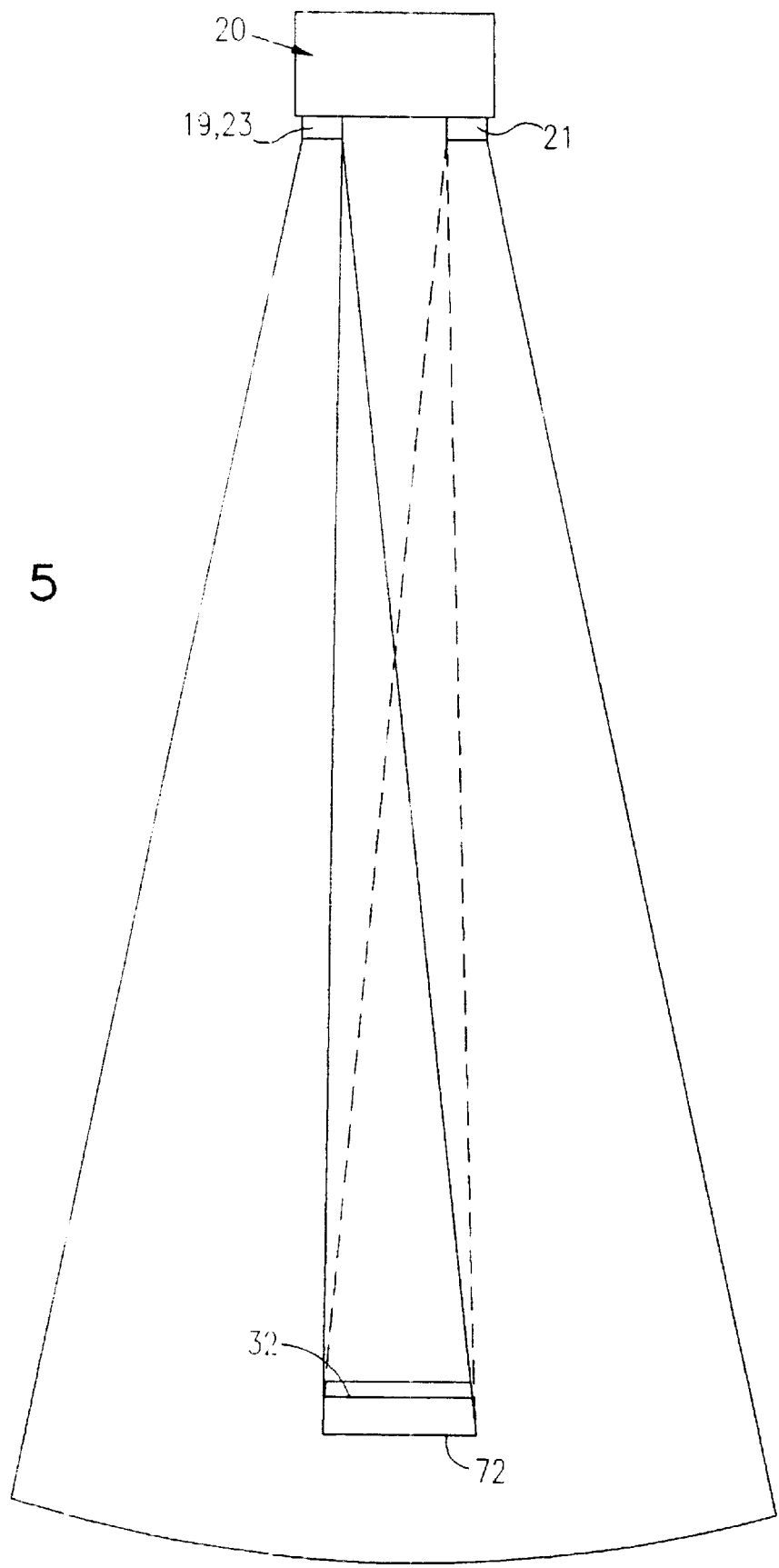
FIG. 5 is a sectional illustration taken along the plane B shown in FIG. 1, perpendicular to plane A, and corresponding to employment of three sensors of the safety sensor system.

Reference is now made to FIGS. 4 and 5 which are illustrations taken along planes A and B, respectively, shown in FIG. 1, and correspond to employment of three sensors of sensor system 20, such as sensors 19, 21 and 23. In accordance with a preferred embodiment of the invention, the internal configuration of the protected volume is defined not only by suitably limiting the time window of reflected energy but also by triangulation in three dimensions.

It can be seen that if it is desired to eliminate energy reflections from the top facing surface of step 26, it is not necessary to ignore energy reflections during full intervals of time within the time window, as in the embodiment of FIG. 2. Only portions of these intervals, corresponding to the width, depth and location of the top facing surfaces of step 26 need be ignored. These portions are determined by triangulation of the outputs of the three sensors 19, 21 and 23 and are indicated in FIG. 4 by reference numerals 70 and in FIG. 5 by reference numerals 72.

Within each distance outline corresponding to an interval outline, a corresponding top surface 32 of a step 26 is schematically drawn to illustrate that the location, depth and width of the portion of the distance outline which is ignored corresponds to the depth, width and location of the step and is determined by triangulation in three dimensions.

Figure 6:
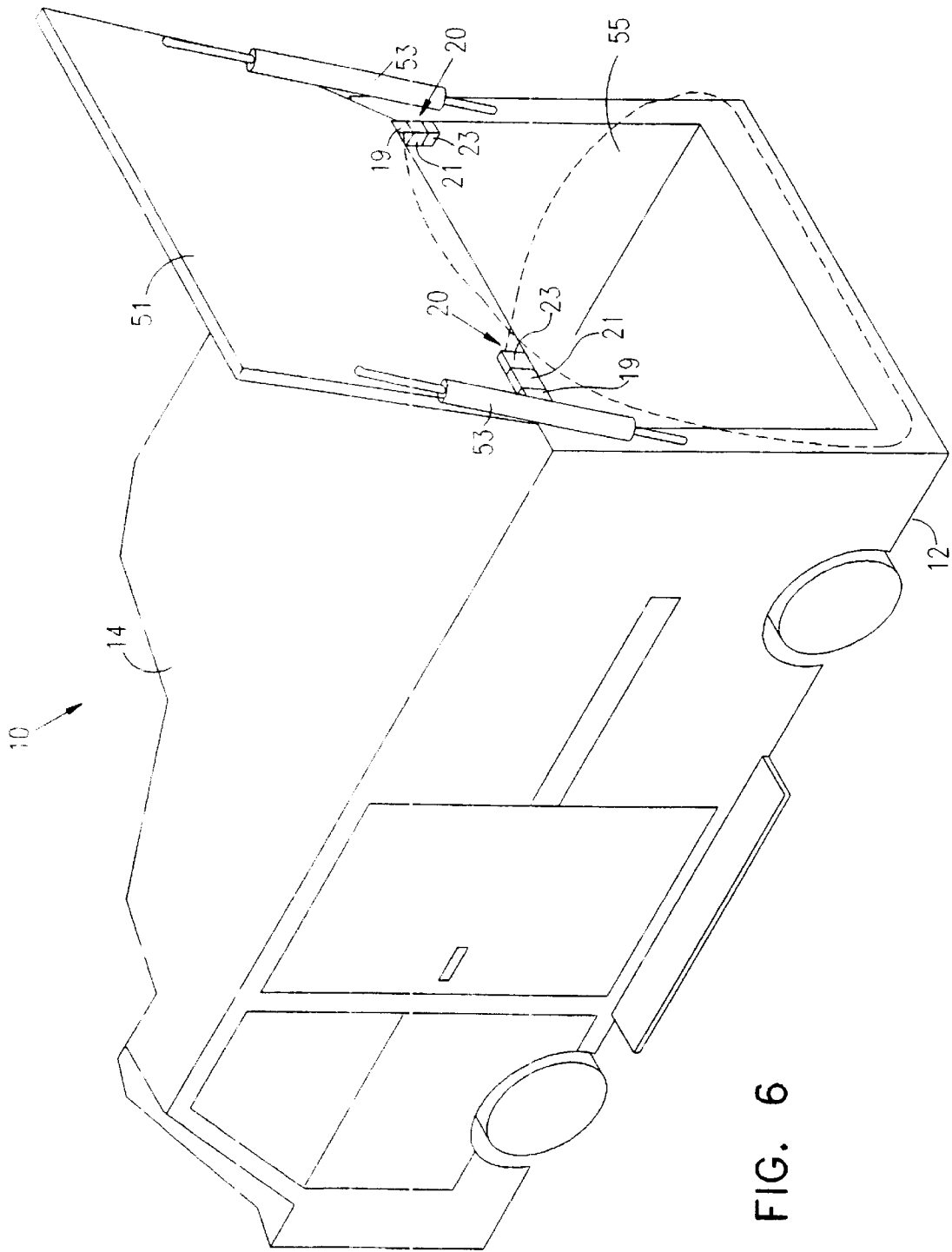
FIG. 6 is a simplified pictorial illustration of a van with a hatchback door and provided with a sensor system for warning of danger of closing the sliding door, constructed and operative in accordance with a preferred embodiment of the present invention.

Reference is now made to FIG. 6 which illustrates van 10 with a hatchback door 51 which preferably opens by means of gas-spring arms 53, as is known in the art. Sensor system 20 may be mounted in the vicinity of hatchback door 51 on a stationary portion of body 14. Alternatively or additionally, sensor system 20 may be mounted on hatchback door 51 itself, as shown in dashed lines in FIG. 6.

Sensors 19, 21 and 23 of sensor system 20 may be used to sense the presence of an object within a predetermined volume 55, also termed the "protected" volume, in the vicinity of door 51, in a manner substantially similar, mutatis mutandis, as described hereinabove for protected volume 22 with reference to FIGS. 1–5. In the embodiment of FIG. 6, it is desired to eliminate energy reflections from surfaces of gas-spring arms 53, rather than from the top facing surface of step 26, as described hereinabove for protected volume 22.

Figure 7:
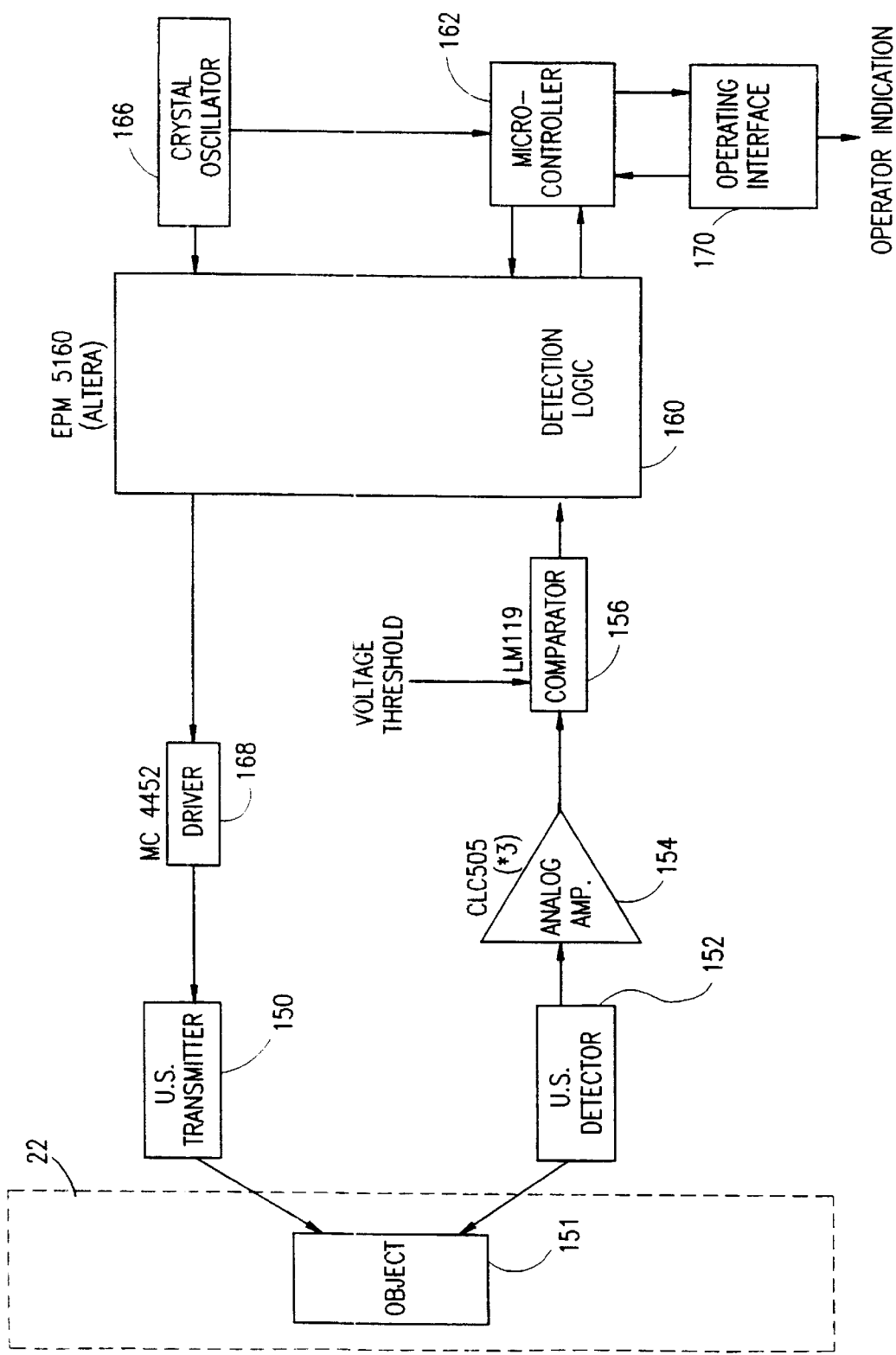
FIG. 7 is a simplified block diagram illustration of circuitry employed in the apparatus of FIGS. 1 and 6.

Reference is now made to FIG. 7, which is a simplified block diagram illustration of circuitry employed in the system of FIGS. 1 and 6. An ultrasonic transmitter 150 transmits ultrasonic energy, typically having a frequency in excess of 20 KHz into protected volume 22 (FIG. 1) or protected volume 55 (FIG. 6). Reflected ultrasonic energy from objects such as an object 151 within the protected volume 22 or 55, is received at one or more detectors 152, such as a model 400ER 250 of Prowave Company of Taiwan, which typically is sensitive only to the frequency of the transmitter 150. The transmitter 150 and the detector 152 may be embodied in an unitary transceiver.

Preferably at least one of the transmitters 150 and detectors 152 and possibly both of them are operative within predetermined solid angles, thereby to limit false detections which could result from reflections of ultrasonic energy from outside the desired predetermined volume.

In accordance with a preferred embodiment of the present invention, the arrangement of the transmitters 150 and the detectors 152 may enable the circuitry of FIG. 7 to determine the location of the object by triangulation.

The output of detector 152 is supplied to an analog amplifier 154, which may be embodied in 3 CLC505 chips. The output of the analog amplifier 154 is supplied to a threshold comparator 156, such as an LM 119 chip, which compares the output of detector 152 with a predetermined threshold.

The output of comparator 156 is supplied to detector logic circuitry 160 which defines a time window following transmission of the ultrasonic energy by transmitter 150, for receipt of reflected ultrasonic energy. This time window corresponds to distance from the transmitter and is operative to define the detection volume. The detector logic circuitry 160 is preferably embodied in an EPM 5160 chip commercially available from Altera of San Jose, Calif.

A microcontroller 162 receives an input from a crystal oscillator 166 which also provides an output to detection logic circuitry 160, which is used for actuating a driver 168, which drives transmitter 150. Driver 168 is typically embodied in a MC 4452 chip, commercially available from Motorola.

Microcontroller 162 interfaces with an operating interface circuit 170. The operating interface circuitry 170 may provide a "CLEAR" door signal directly to alarm device 24 (FIG. 1) or alternatively provides an indication permitting safe closing of the door 18 or 51.

Figure 8:
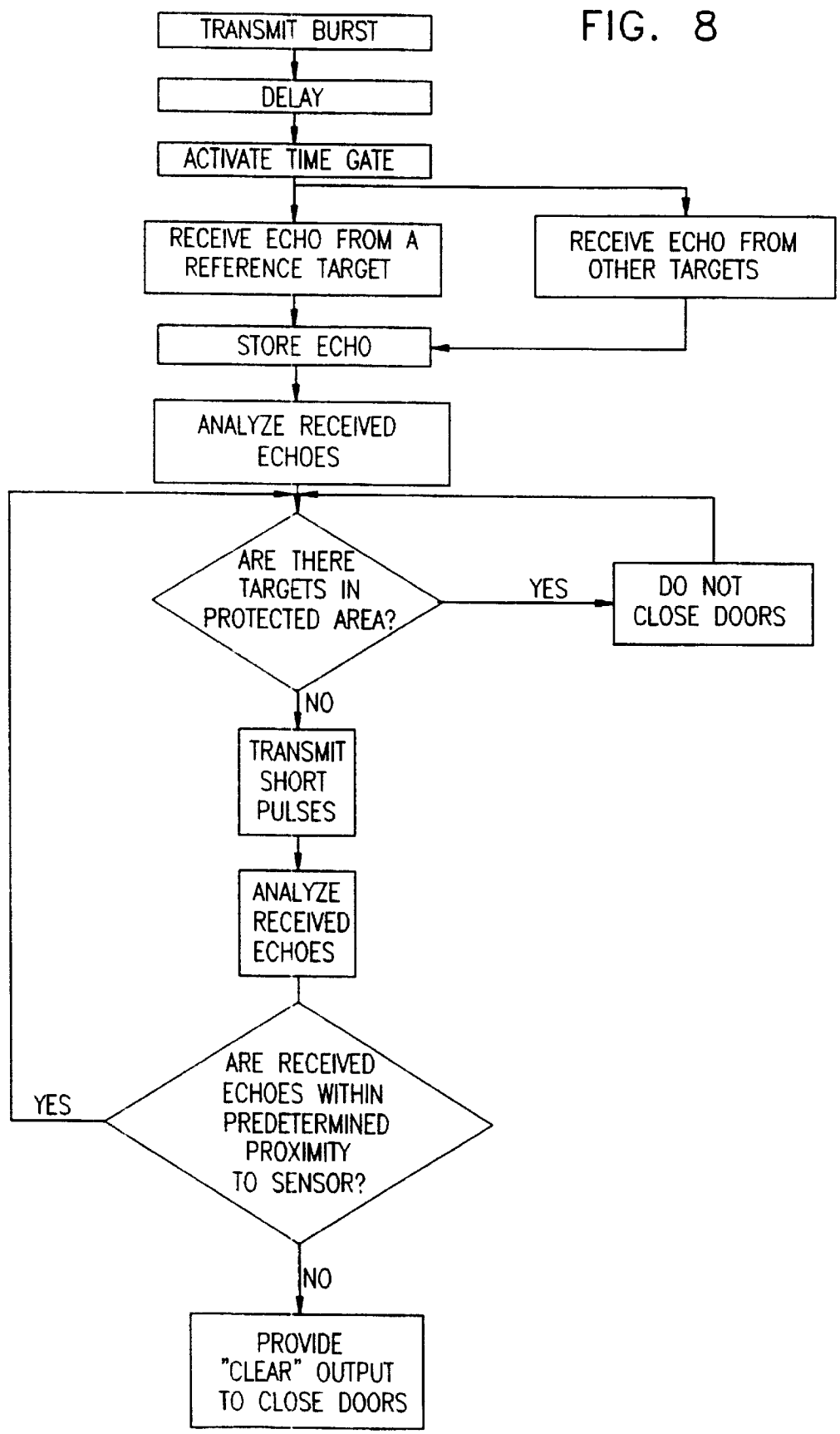
FIG. 8 is a simplified flow chart illustrating operation of the apparatus of FIG. 7.

Reference is now made to FIG. 8, which illustrates the operation of part of the circuitry of FIG. 7. The functionality which will be described hereinbelow with reference to FIG. 8 is typically carried out by detection logic circuitry 160 and/or micro-controller 162.

A burst of typically between 4 and 10 pulses of ultrasonic energy is directed to the protected volume 22 or 55 (FIG. 1 or FIG. 6, respectively). Following a predetermined time delay, a reflected energy receipt time gate is opened for receipt of echoes of ultrasonic energy reflected from the protected volume 22 or 55.

During the time that the reflected energy time gate is open echoes reflected from inside the protected volume 22 or 55 are received. These echoes preferably include echoes received from a predetermined reference target within the protected volume 22 or 55, such as the stair 26 or gas-spring arms 53, as well as echoes received from non-reference targets within the protected volume 22 or 55, such as persons or their belongings within the protected volume.

The received echoes are stored and then analyzed.

Upon analysis, if all of the echo pulses received are found to originate from a location within a predetermined proximity to the reference target, the protected volume is deemed to be clear and a "CLEAR" signal is sent to alarm device 24.

At this stage, a short duration pulse, typically of a duration of one microsecond, is transmitted into the protected volume 22 or 55 in order to determine whether any object is within the protected volume 22 or 55 but sufficiently close to the transmitter 150 so as not to have been detected by the longer pulses. If no echoes of the short pulses are received within a predetermined time period corresponding to the protected volume, an appropriate "CLEAR" output is provided via interface 170 (FIG. 7) to alarm device 24.

If not all of the echo pulses received are found to originate from a location within a predetermined proximity to the reference target, a contrary output is provided which indicates that the doors are not to be closed.

Figure 9:
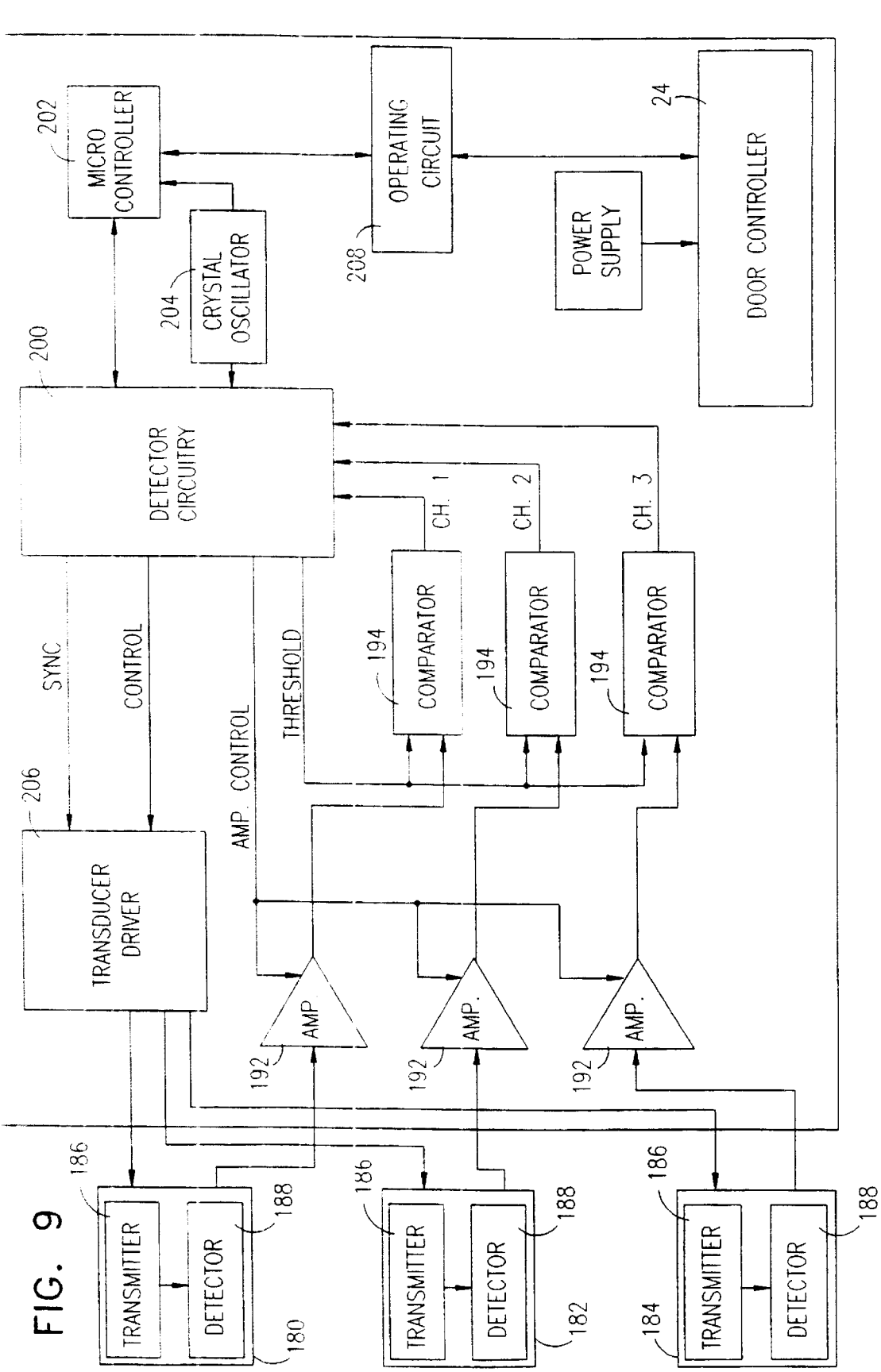
FIG. 9 is a simplified block diagram illustration of circuitry employed in the apparatus of FIGS. 4 and 5.

Reference is now made to FIG. 9, which is a simplified block diagram illustration of circuitry employed in the automatic door operating system of FIGS. 4 and 5. Three separate ultrasonic transducers 180, 182 and 184, each include an ultrasonic transmitter 186 which transmits ultrasonic energy, typically having a frequency in excess of 20 KHz into the protected volume 22 or 55. Reflected ultrasonic energy is received at three separate detectors 188, each of which forms part of one of transducers 180, 182 and 184. Detectors 188 may be any suitable detectors, such as a model 400ER 250 of Prowave Company of Taiwan, which typically is sensitive only to the frequency of the transmitter 186.

Preferably at least one of the transmitters 186 and detectors 188 and possibly both of them are operative within predetermined solid angles, thereby to limit false detections which could result from reflections of ultrasonic energy from outside the desired predetermined volume.

In accordance with a preferred embodiment of the present invention, the arrangement of the transmitters 186 and the detectors 186 may enable the circuitry of FIG. 9 to determine the location of the object by triangulation in three dimensions.

The outputs of detectors 186 are each supplied to analog amplifiers 192, which may be embodied in 3 CLC505 chips. The output of each analog amplifier 192 is supplied to a threshold comparator 194, such as an LM 119 chip, which compares the output of detector 186 with a predetermined threshold.

The outputs of comparators 194 are supplied to detector logic circuitry 200 which defines one or more time windows following transmission of the ultrasonic energy by transmitter 186, for receipt of reflected ultrasonic energy. These time windows correspond to distance from the transmitter and are operative to define the detection volume. The detector logic circuitry 200 is preferably embodied in an EPM 5160 chip commercially available from Altera of San Jose, Calif.

A microcontroller 202 receives an input from a crystal oscillator 204 which also provides an output to detection logic circuitry 200, which is used for actuating a driver 206, which drives transmitters 186. Driver 206 is typically embodied in a MC 4452 chip, commercially available from Motorola.

Microcontroller 202 interfaces with an operating interface circuit 208. The operating interface circuit 208 may provide a "CLEAR" door signal directly to alarm device 24 (FIG. 1) or alternatively provides an indication permitting safe closing of the door 18 or 51.

Figure 10:
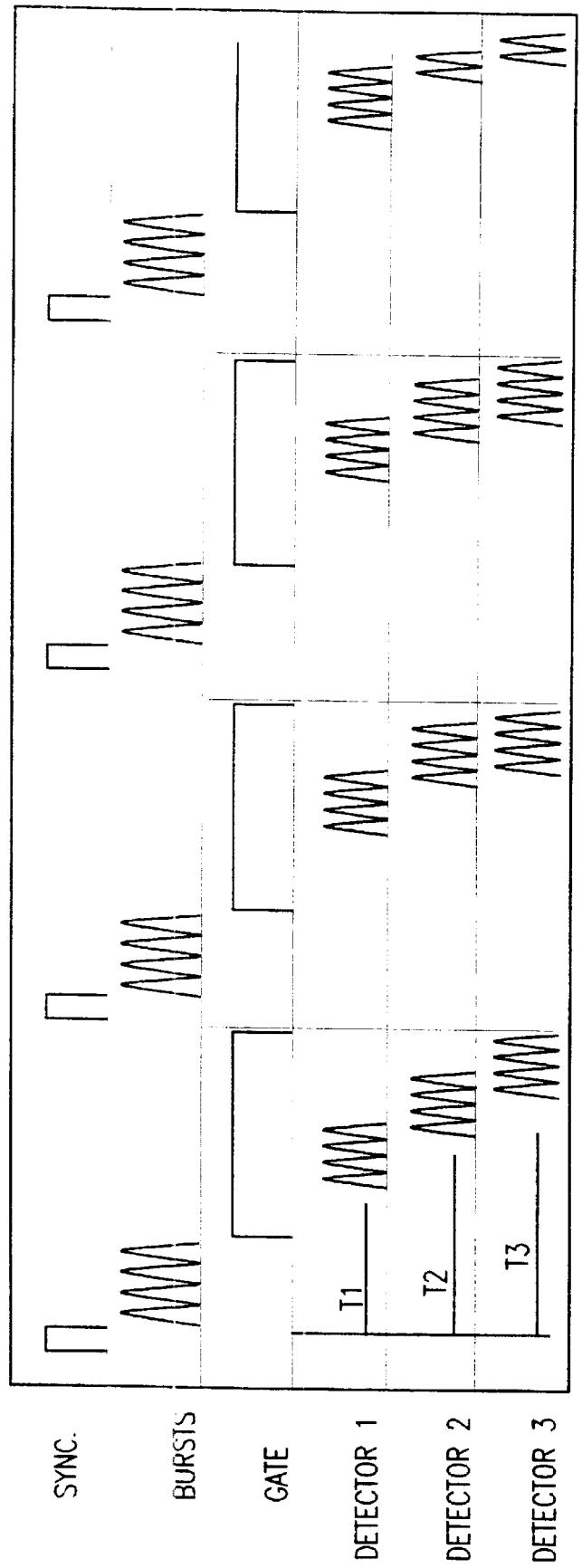
FIG. 10 is a timing diagram illustrating operation of the circuitry of FIG. 9.

Reference is now made to FIG. 10 which is a timing diagram illustrating operation of the circuitry of FIG. 9. Synchronization pulses, supplied by detector circuitry in response to an input from microcontroller 202, cause the transducer driver 206 to cause the transmitters 186 preferably in all three transducers 180, 182 and 184, to simultaneously transmit a burst of ultrasonic energy pulses into the protected volume 22 or 55. The bursts are typically of duration about 100 microseconds.

Following each burst, echoes received from the protected volume 22 or 55 are received by detectors 188 of the transducers 180, 182 and 184. The outputs of detectors 188 are only considered if they fall within a time window defined by a gate interval generated by microcontroller 202. In the illustrated example of FIG. 10, the echoes of the bursts are received at different times by different detectors. Clearly the time of receipt by a given detector is a function of the distance of a target from that detector. In such a way, time based triangulation is employed to determine the location of the target in the protected volume.

Figure 11:
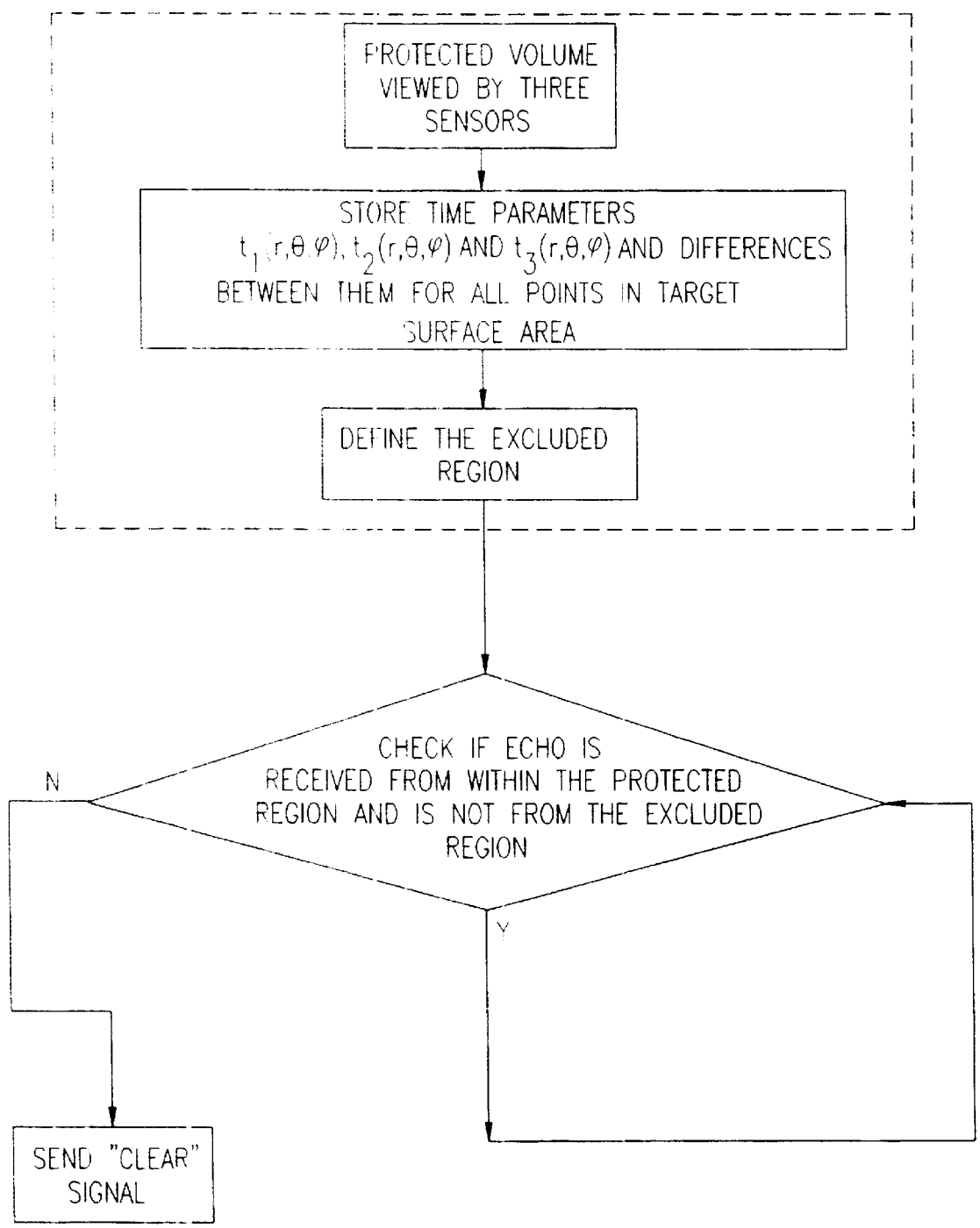
FIG. 11 is a detailed flow chart illustrating part of the operating algorithm of the safety apparatus of the present invention.

FIG. 11 illustrates the operating algorithm of the apparatus of FIG. 9 in eliminating consideration of echoes received from defined volumes enclosing fixed objects within the protected volume. The protected volume is initially viewed by three sensors and the fixed objects therein are mapped. An excluded volume is then defined which encloses each of the mapped fixed objects.

During steady state operation of the apparatus, echoes from both outside the protected volume and from the excluded volumes (where an excluded volume is defined as a legitimate region including background objects) which enclose the fixed objects within the protected volume are not considered. If and only if echoes are received from within the protected volume but outside the excluded volumes is door closure prevented or a corresponding action taken or avoided in another operational context.

It is a particular feature of the present invention that the sensor system 20 of the present invention can be used not only for preventing closing of doors but also for controlling operation of vehicle air bags.

Figure 12:
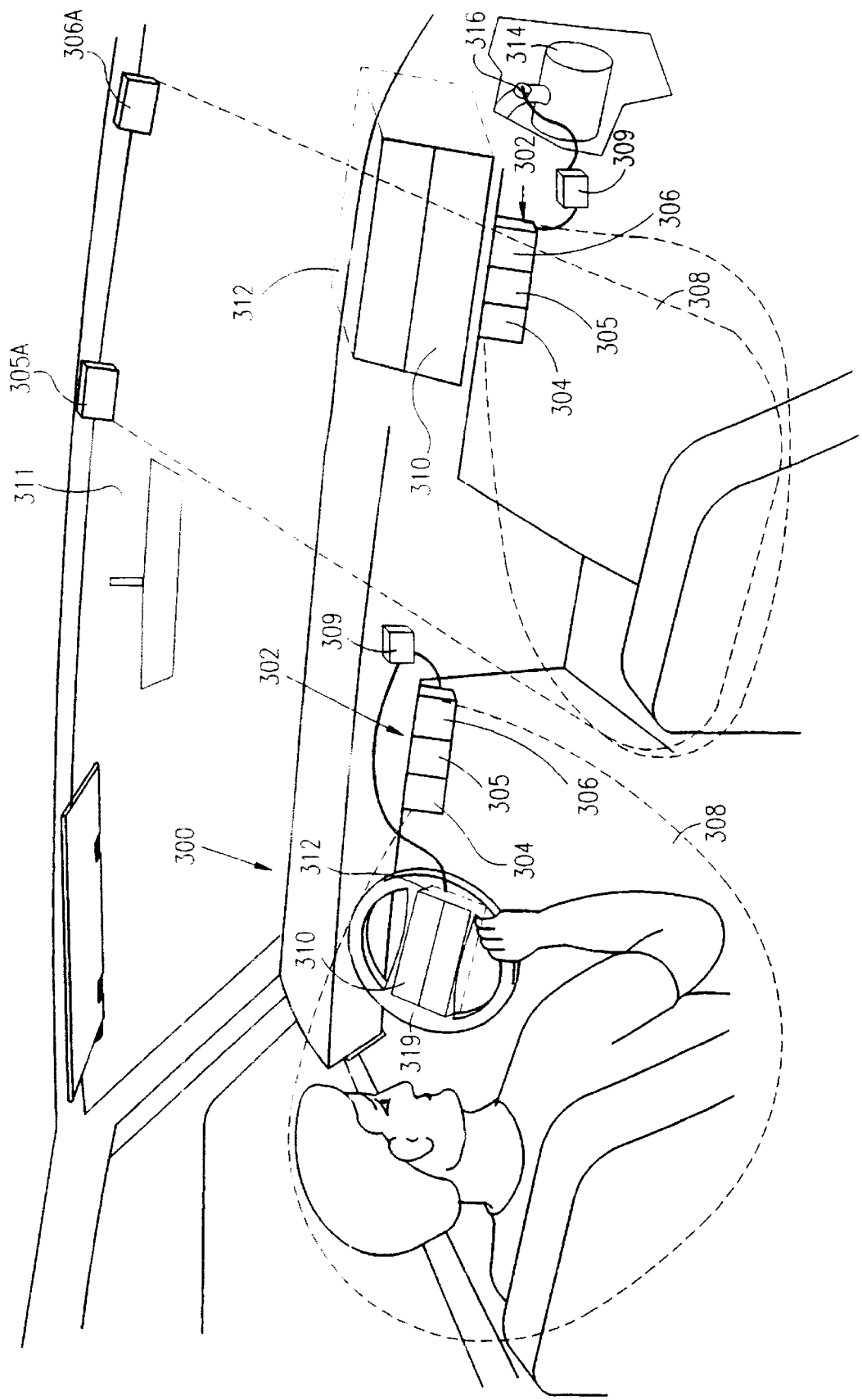
FIG. 12 is a general flow chart illustrating operation of a preferred embodiment of the present invention.

Reference is now made to FIG. 12 which illustrates a system 300 for controlling operation of vehicle air bags in accordance with a preferred embodiment of the present invention. System 300 preferably includes a sensor system 302, preferably substantially similar to sensor system 20 described hereinabove. Sensor system 302 may include one, two or three sensors 304, 305 and 306, preferably substantially similar to sensors 19, 21 and 23 described hereinabove. Sensor system 302 senses the presence of an object within a predetermined volume 308, also termed the "protected" volume, in the vicinity of an occupant in front of an air bag 310 of a vehicle 311, such as a driver or a passenger.

Sensors 304, 305 and 306 preferably sense ultrasonically as described hereinabove with respect to sensors 19, 21 and 23, that is, the sensors transmit energy pulses into protected volume 308 and receive echoes of energy reflected from protected volume 308 during a time window. Alternatively, sensors 304, 305 and 306 may sense optically or by means of any electromagnetic wave energy.

Sensors 304, 305 and 306 may be clustered together on the dashboard of vehicle 311. Alternatively, the sensors may be mounted at any other convenient location in the interior of the vehicle so as to view protected volume 308, such as shown at locations designated 305A and 306A in FIG. 12.

Logic circuitry 309, substantially similar in operation to logic circuitry described hereinabove with respect to FIGS. 7–11, is provided which is responsive to sensor system 302 for determining geometric data of objects in protected volume 308. In the case of ultrasonic sensors, logic circuitry 309 is operative to ignore energy reflections from at least one object, such as a steering wheel 319, sensed by sensor system 302 during certain intervals of time within the time window, as described hereinabove with respect to FIGS. 7–11. In other words, logic circuitry 309 is capable of ignoring reflections from steering wheel 319 in a similar manner as the logic circuitry of FIGS. 7–11 ignores the top surface of step 26, mutatis mutandis.

Air bag 310 is preferably operated by a variable expansion air bag system 312 which is capable of inflating air bag 310 to various configurations upon receipt of a signal outputted by sensor system 302. Variable expansion air bag system 312 preferably includes an inflator 314 which inflates air bag 310 with a fluid, such as compressed air, and a valve 316 controlled by logic circuitry 309. Valve 316 controls inlet of fluid into air bag 310.

In accordance with the methods described hereinabove with reference to FIGS. 1–11, sensor system 302 may determine if a vehicle seat is first of all actually occupied. In this way, if the passenger seat is unoccupied, the passenger seat air bag will not be unnecessarily deployed. If the seat is occupied, sensor system 302 senses the geometry of the occupant and sends a signal to variable expansion air bag system 312 to cause an optimal inflation of air bag 310. For example, the sensed geometry may signal and alert variable expansion air bag system 312 that a particularly short driver is occupying the driver's seat and thereby cause air bag 310 to inflate in such a way that the driver is protected from and damage and is not asphyxiated by an overlarge bag.

It is noted that the sensors of the present invention can sense and distinguish between stationary and moving objects in the protected volume. For example, the movements of an infant moving about in a car seat can be sensed and used to distinguish between a moving infant and a stationary car seat. The air bag may then be instructed to inflate in such a way so as not to harm the infant no matter what his or her movements may be.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove.

Rather the scope of the present invention is defined only by the claims which follow:

1. A safety system for a vehicle, comprising:
   at least one sensor viewing at least one region in an interior portion of a vehicle defining a protected volume at least partially in front of a vehicle air bag; and
   logic circuitry responsive to said at least one sensor for determining geometric data of objects in said protected volume,
   wherein said sensor transmits energy pulses into said protected volume and receives echoes of energy reflected from said protected volume during a time window and said logic circuitry is operative to ignore energy reflections from at least one object sensed by said at least one sensor during certain intervals of time within said time window.

2. A system according to claim 1 and comprising a variable expansion air bag system operatively connected to and controlled by said logic circuitry, wherein said variable expansion air bag system inflates said air bag in accordance with information received from said logic circuitry.

3. A system according to claim 2 wherein said variable expansion air bag system comprises an inflator which inflates said air bag with a fluid and a valve controlled by said logic circuitry, said valve controlling inlet of said fluid into said air bag.

4. A system according to claim 1 and wherein said at least one sensor is operative to sense a moving object in said protected volume.

5. A system according to claim 1 and wherein said at least one sensor is operative distinguish between a moving object and a stationary object in said protected volume.

6. A method for controlling operation of vehicle air bags, comprising:
   using at least one sensor to sense at least one region in an interior portion of a vehicle defining a protected volume at least partially in front of a vehicle air bag;
   determining geometric data of objects in said protected volume in accordance with echoes from said at least one sensor; and
   inflating said air bag in accordance with said geometric data,
   wherein said at least one sensor transmits energy pulses into said protected volume and receives said echoes of energy reflected from said protected volume during a time window and said logic circuitry is operative to ignore energy reflections from at least one object sensed by said at least one sensor during certain intervals of time within said time window.

7. A method according to claim 6 and comprising suppressing inflation of said air bag in accordance with said geometric data.

8. A method according to claim 6 and comprising sensing a moving object in said protected volume.

9. A method according to claim 6 and comprising distinguishing between a moving object and a stationary object in said protected volume.

10. A method of warning of danger of closing a vehicle sliding door, the method comprising:
   using at least one sensor to sense at least one region in the vicinity of a sliding door of a vehicle;
   outputting at least one region clear output signal from said at least one sensor to logic circuitry responsive to said at least one sensor; and
   using said logic circuitry to provide a warning of danger of closing said sliding door in the absence of a region clear output signal,
   wherein said at least one sensor transmits energy pulses into said at least one region and receives echoes of energy reflected from said at least one region during a time window and said logic circuitry is operative to ignore energy reflections from at least one object sensed by said at least one sensor during certain intervals of time within said time window.

11. A method according to claim 10 and comprising using said logic circuitry to signal permissibility of closing said door in the presence of a region clear output signal.

12. A method according to claim 10 and comprising ignoring any sensed objects in predetermined regions within an outer boundary of said predetermined volume, corresponding to predetermined time domains.

13. A method of warning of danger of closing a vehicle hatchback door, the method comprising;
   using at least one sensor to sense at least one region in the vicinity of a hatchback door of a vehicle;
   outputting at least one region clear output signal from said at least one sensor to logic circuitry responsive to said at least one sensor; and
   using said logic circuitry to provide a warning of danger of closing said hatchback door in the absence of a region clear output signal,
   wherein said at least one sensor transmits energy pulses into said at least one region and receives echoes of energy reflected from said at least one region during a time window and said logic circuitry is operative to ignore energy reflections from at least one object sensed by said at least one sensor during certain intervals of time within said time window.

14. A method according to claim 13 and comprising using said logic circuitry to signal permissibility of closing said door in the presence of a region clear output signal.

15. A method according to claim 13 and comprising ignoring any sensed objects in predetermined regions within an outer boundary of said predetermined volume, corresponding to predetermined time domains.

16. A vehicle including a chassis, a body, propulsion apparatus, at least one door and door control apparatus comprising:
   at least one sensor viewing at least one region in the vicinity of said door;
   logic circuitry responsive to said at least one sensor for providing at least one region clear output signal; and
   an alarm device responsive at least to an absence of a region clear output signal to provide a warning signal of danger of closing said door and responsive at least to a presence of a region clear output signal to provide a signal indicating permissibility of closing said door,
   wherein said at least one sensor transmits energy pulses into said at least one region and receives echoes of energy reflected from said at least one region during a time window and said logic circuitry is operative to ignore energy reflections from at least one object sensed by said at leased one sensor during certain intervals of time within said time window.

17. A vehicle according to claim 16 wherein said warning signal comprises at least one of an audible and a visual output signal.

18. A vehicle according to claim 16 wherein said signal indicating permissibility of closing said door comprises at least one of an audible and a visual output signal.

19. A method for controlling operation of a vehicle door comprising the steps of:
   using at least one ultrasonic sensor to sense at least one region of a vehicle defining a protected volume at least partially in front of a leading edge of a vehicle door;
   determining geometric data of objects in said protected volume in accordance with echoes from said at least one sensor; and
   distinguishing between objects in said protected volume whose presence should prevent further movement of the vehicle door and objects in said protected volume whose presence should not prevent further movement of the vehicle door; and
   governing operation of said vehicle door based on said distinguishing operation,
   wherein said at least one sensor transmits energy pulses into said protected volume and receives said echoes of energy reflected from said protected volume during a time window and said logic circuitry is operative to ignore energy reflections from at least one object sensed by said at least one sensor during certain intervals of time within said time window.

20. A method for controlling operation of a vehicle door according to claim 19 and wherein said at least one ultrasonic sensor is operative during motion of said vehicle door.

21. A method for controlling operation of a vehicle door according to claim 19 and wherein said at least one ultrasonic sensor is mounted on said vehicle door for motion together therewith.

22. A method for controlling operation of a vehicle door according to claim 19 and wherein said at least one ultrasonic sensor is mounted on said vehicle.

23. A method for controlling operation of a vehicle door according to claim 19 and wherein said determining and distinguishing steps take place repeatedly during motion of said vehicle door.

24. A method for controlling operation of a movable vehicle component comprising the steps of:
   using at least one ultrasonic sensor to sense at least one region of a vehicle defining a protected volume at least partially in front of a leading edge of the movable vehicle component;
   determining geometric data of objects in said protected volume in accordance with echoes from said at least one sensor; and
   distinguishing between objects in said protected volume whose presence should prevent further movement of the movable vehicle component and objects in said protected volume whose presence should not prevent further movement of the movable vehicle component; and
   governing operation of said movable vehicle component based on said distinguishing operation,
   wherein said at least one sensor transmits energy pulses into said protected volume and receives said echoes of energy reflected from said protected volume during a time window and said logic circuitry is operative to ignore energy reflections from at least one object sensed by said at least one sensor during cartoon intervals of time within said time window.

25. A method for controlling operation of a vehicle component according to claim 24 and wherein said at least one ultrasonic sensor is operative during motion of said vehicle component.

26. A method for controlling operation of a vehicle component according to claim 25 and wherein said at least one ultrasonic sensor is mounted on said vehicle component for motion together therewith.

27. A method for controlling operation of a vehicle component according to claim 25 and wherein said determining and distinguishing steps take place repeatedly during motion of said vehicle component.

28. A system for controlling operation of a vehicle door comprising:

at least one ultrasonic sensor operative to sense at least one region of a vehicle defining a protected volume at least partially in front of a leading edge of a vehicle door;

object identifying circuitry determining geometric data of objects in said protected volume in accordance with echoes from said at least one sensor; and object distinguishing circuitry distinguishing between objects in said protected volume whose presence should prevent further movement of the vehicle door and objects in said protected volume whose presence should not prevent further movement of the vehicle door; and a movement controller governing operation of said vehicle door based on said distinguishing operation, wherein said at least one sensor transmits energy pulses into said protected volume and receives said echoes of energy reflected from said protected volume during a time window and said logic circuitry is operative to ignore energy reflections from at least one object sensed by said at least one sensor during certain intervals of time within said time window.

29. A system for controlling operation of a vehicle door according to claim 28 and wherein said at least one ultrasonic sensor is operative during motion of said vehicle door.

30. A system for controlling operation of a vehicle door according to claim 28 and wherein said at least one ultrasonic sensor is mounted on said vehicle door for motion together therewith.

31. A system for controlling operation of a vehicle door according to claim 28 and wherein said at least one ultrasonic sensor is mounted on said vehicle.

32. A system for controlling operation of a vehicle door according to claim 28 and wherein said determining and distinguishing steps take place repeatedly during motion of said vehicle door.

33. A system for controlling operation of a movable vehicle component comprising:

at least one ultrasonic sensor to sense at least one region of a vehicle defining a protected volume at least partially in front of a leading edge of the movable vehicle component;

object identifying circuitry determining geometric data of objects in said protected volume in accordance with echoes from said at least one sensor; and object distinguishing circuitry distinguishing between objects in said protected volume whose presence should prevent further movement of the movable vehicle component and objects in said protected volume whose presence should not prevent further movement of the movable vehicle component; and an operation controller governing operation of said movable vehicle component based on said distinguishing operation, wherein said at least one sensor transmits energy pulses into said protected volume and receives said echoes of energy reflected from said protected volume during a time window and said logic circuitry is operative to ignore energy reflections from at least one object sensed by said at least one sensor during certain intervals of time within said time window.

34. A system for controlling operation of a vehicle component according to claim 33 and wherein said at least one ultrasonic sensor is operative during motion of said vehicle component.

35. A system for controlling operation of a vehicle component according to claim 33 and wherein said at least one ultrasonic sensor is mounted on said vehicle component for motion together therewith.

36. A system for controlling operation of a vehicle component according to claim 33 and wherein said determining and distinguish steps take place repeatedly during motion of said vehicle component.

\* \* \* \* \*